United States Patent [19]
Kawabuchi et al.

[11] Patent Number: 5,740,496
[45] Date of Patent: Apr. 14, 1998

[54] IMAGE FORMING APPARATUS

[75] Inventors: Yoichi Kawabuchi; Takeshi Morikawa, both of Toyokawa, Japan

[73] Assignee: Minolta Co, Ltd., Osaka, Japan

[21] Appl. No.: 757,633

[22] Filed: Dec. 2, 1996

[30] Foreign Application Priority Data

Dec. 7, 1995 [JP] Japan .................. 7-319148

[51] Int. Cl.⁶ .................. G03G 15/00; G06F 11/30
[52] U.S. Cl. .................. 399/83; 358/401; 358/437; 358/468; 399/19; 399/81
[58] Field of Search .................. 399/144, 81, 82, 399/87, 83, 85, 19; 358/448, 401, 468, 437, 296

[56] References Cited

U.S. PATENT DOCUMENTS

| | | |
|---|---|---|
| 4,907,031 | 3/1990 | Kawatsura et al. .................. 399/19 |
| 5,097,341 | 3/1992 | Forest . |
| 5,206,735 | 4/1993 | Gauronski et al. .................. 358/296 |
| 5,245,368 | 9/1993 | Farrell et al. .................. 358/401 |
| 5,491,557 | 2/1996 | Nakajima et al. .................. 358/296 |
| 5,585,941 | 12/1996 | Maemura .................. 358/437 X |

*Primary Examiner*—S. Lee
*Attorney, Agent, or Firm*—Burns, Doane, Swecker & Mathis, LLP

[57] ABSTRACT

A multijob image forming apparatus performing the following operation, which allows operation similar to single job operation without increasing number of keys on an operation panel, is provided. When two jobs, that is, reading and printing are stopped by one stop key and a clear key is pressed, the display is switched to a data clear display, when document is being read and printing is in progress. By using the data clear display, data corresponding to the reading operation or the data corresponding to the printing operation, which is to be discarded, is selected.

7 Claims, 22 Drawing Sheets

| AREA | PAGE | FORWARD CONCATENATION | REARWARD CONCATENATION | ADDITIONAL INFORMATION |
|------|------|-----------------------|------------------------|------------------------|
| 01 | 1 | FF | 02 | |
| 02 | 1 | 01 | FF | |
| 03 | 2 | FF | 04 | |
| 04 | 2 | 03 | FF | |
| ⋮ | | | | |

MT1

IMAGE FORMING APPARATUS

BACKGROUND OF THE INVENTION

1. Field of the Invention

The present invention relates to an image forming apparatus and, more specifically, to an image forming apparatus which is capable of simultaneously performing image forming operation and image reading operation.

2. Description of the Related Art

In the field of conventional multijob copying machine which is one of an image forming apparatus allowing registration of multiple jobs, a multijob copying machine has been disclosed in U.S. Pat. No. 5,097,341, for example, which is capable of performing reading operation of the next job while a job in the memory is being printed. This reference discloses processes when the jobs are registered. However, the processes for interrupting and abandoning a job are not specifically proposed.

In the conventional multijob copying machine, it is possible to separately register a read job and a print job, and these jobs can be performed simultaneously. Therefore, when these two jobs are performed simultaneously, it is possible to stop each job, by providing a stop key for each job. However, in that case, a stop key is necessary for each job, which means that the number of keys on the operation panel is increased, and hence operation will be complicated for the user. If the jobs are stop simultaneously by one key, it cannot be determined which of the jobs is to be stopped. Further, a general user is accustomed to operation of a conventional single job copying machine. Therefore, when the operation of the multijob copying machine is much different from the operation of a single job copying machine, it may be inconvenient for the user to operate the unfamiliar machine.

SUMMARY OF THE INVENTION

An object of the present invention is to provide a user-friendly image forming apparatus which allow multijob operation in a manner similar to that of single job operation.

The above described object of the present invention can be attained by the image forming apparatus capable of processing a plurality of jobs, including:

image reading unit for reading document images; storing unit for storing, for each job, the image data read by said image reading unit; an image forming unit for forming an image based on the image data stored in said storing unit; control unit for operating said image reading unit and said image forming unit in parallel; selecting unit for selecting at least one of the image data for each of the jobs stored in said storing unit; and erasing unit for erasing image data of the job selected by said selecting unit. In accordance with the present invention, the image data of the selected job is erased. Therefore, an image forming device which is convenient for use can be obtained.

More preferably, the image forming apparatus includes stop instruction unit for instructing stop of the operation, and said selecting unit selects image data of each job when operation is stopped by said stop instructing unit.

In accordance with the present invention, selection is performed when the operation of the image forming apparatus is stopped. Therefore, an image forming apparatus which is more convenient for use can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 23 shows display screen of a liquid crystal display when a clear key is turned on.

DESCRIPTION OF THE PREFERRED EMBODIMENTS

Figure 1:
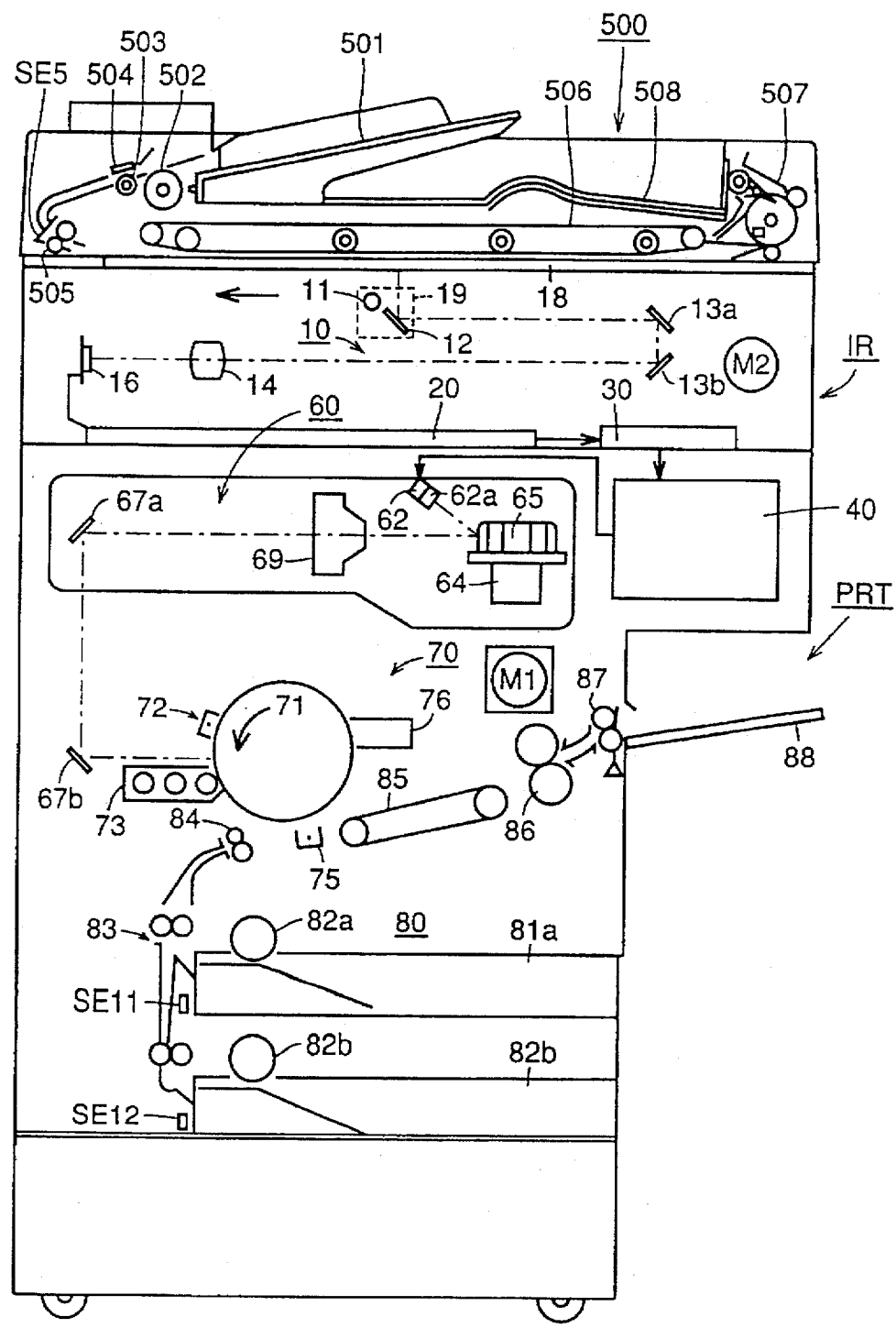
FIG. 1 is a cross section showing an overall structure of a copying machine in accordance with one embodiment of the present invention.

A multijob copying machine which is an image forming apparatus in accordance with one embodiment of the present invention will be described with reference to the figures. FIG. 1 is a cross section showing an overall structure of the copying machine in accordance with the embodiment of the present invention.

Referring to FIG. 1, in the copying machine which will be described in the following, images of documents fed one by one to a platen glass 18 by means of an automatic document feeder (hereinafter referred to as ADF) 500 are read, a laser beam scanning optical system (hereinafter referred to as an optical system) 60 is driven based on the read image data, a latent electrostatic image is formed thereby on a photoreceptor drum 71, and the latent image is developed.

More specifically, the digital copying machine includes a reading system 10 for reading document images and converting the images to document data; an image data processing unit 20 for processing image data transmitted from reading system 10; a memory unit 30; a print unit 40 for driving optical system 60 based on print data transmitted from memory unit 30; optical system 60 for scanning a laser beam emitted from a semiconductor laser 62 onto photoreceptor drum 71; an image forming system 70 for developing and transferring latent images formed on a photoreceptor drum 71; a sheet conveying system 80; and an ADF 500 for feeding documents and having a function of reversing the front and rear surfaces in case of double sided document.

Reading system 10, image data processing unit 20 and memory unit 30 constitute reading apparatus IR, while print unit 40, optical system 60, image forming system 70 and sheet conveying system 80 constitute a print apparatus PRT.

Reading system 10 includes an exposure lamp 11 and a mirror 12 which are incorporated in a scanner 19 moving below platen glass 18, second and third mirrors 13a and 13b, a condensing lens 14, a photoelectric converting element 16 employing a CCD array or the like, and a scan motor M2. Image data processing unit 20 and memory unit 30 will be described later.

Print unit 40 drives optical system 60 line by line in main scanning direction, based on print data.

Optical system 60 includes a semiconductor laser 62 which is controlled (turned on or off) by print unit 40, a polygon mirror 65 for deflecting and scanning the laser beam emitted from semiconductor laser 62, a fθ lens 69 for correcting distortion, aberration and the like of the deflected laser beam, and mirrors 67a and 67b for guiding the laser beam to photoreceptor drum 71.

Image forming system 70 includes a corona charger 72, a developer 73, a transfer charger 75 and a cleaner 76 for cleaning residual toner arranged around photoreceptor drum 71 rotated in the direction of the arrow, along the direction of rotation. The image forming process by image forming system 70 is well-known, and therefore description thereof is not given here.

Sheet conveying system 80 includes automatic paper feeding cassettes 81a, 81b containing stacks of sheet, rollers 82a and 82b for feeding the sheet of paper one by one, a sheet conveying path 83, a timing roller 84, a conveyer belt 85, a toner fixing unit 86, a discharge roller 87 and a discharge tray 88. Sheet conveying system 80 and photoreceptor drum 71 are driven by a main motor M1. Sheet detection sensors are arranged at important portions along sheet conveying path 83.

ADF 500 includes a document tray 501, a pickup roller 502, a sort roller 503, a sort pad 504, a register roller 505, a conveyor belt 506, a reversing roller 507 and a discharge tray 508. The document placed on document tray 501 is conveyed to and stopped on platen glass 18 one by one starting from the lowermost one, and images thereon are read by reading system 10. After reading is completed, the document is rotated once around reversing roller 507 and returned to platen glass 18. Therefore, conveyor belt 506 is adapted to allow forward/reverse rotation. Immediately before the document is fed to platen glass 18, the size of the document is detected by sensor SE5.

The copying machine having the above-described structure reads images of one document, in normal mode, generates print data by appropriately amending the image data if necessary, outputs the print data by optical system 60, and thus forms images on one sheet.

When reading of the document is completed and only the printing operation is in progress, it is possible to set a new job mode. At this time, by turning one a start key, the document corresponding to the new job is read, the new job is registered, and when the printing of the previous job is completed, printing of the registered next job follows.

Figure 2:
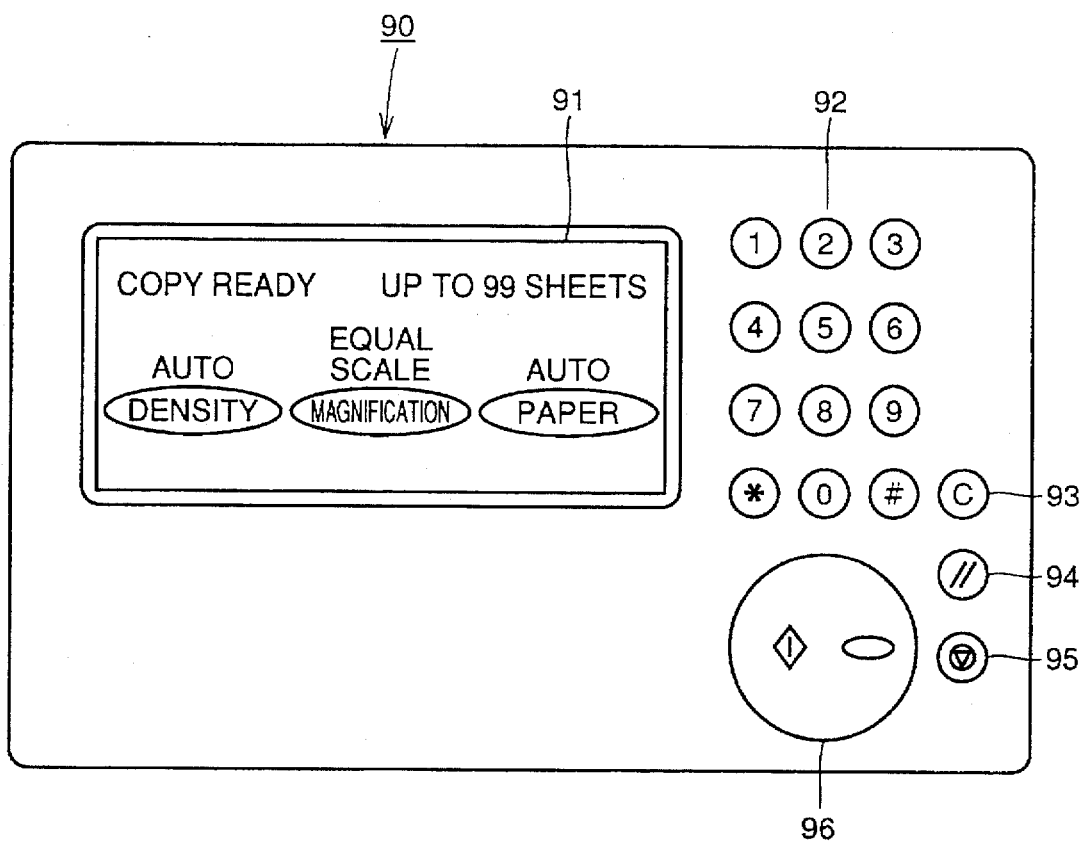
FIG. 2 shows an operation panel of the copying machine shown in FIG. 1.

FIG. 2 shows operation panel 90 of the copying machine. On operation panel 90, there are arranged a liquid crystal display 99 displaying a state and for designating various modes; ten keys 92 for inputting numerical condition (number of copies, magnification and so on) of copying; a clear key 93 for returning the numerical condition to a standard value; a panel reset key 94 for initializing copying mode; a stop key 95 for stopping copying operation; and a start key 96 for instructing start of copying. In the initial state when the power of the copying machine is turned on, the copying mode is set to a normal mode.

Figure 3:
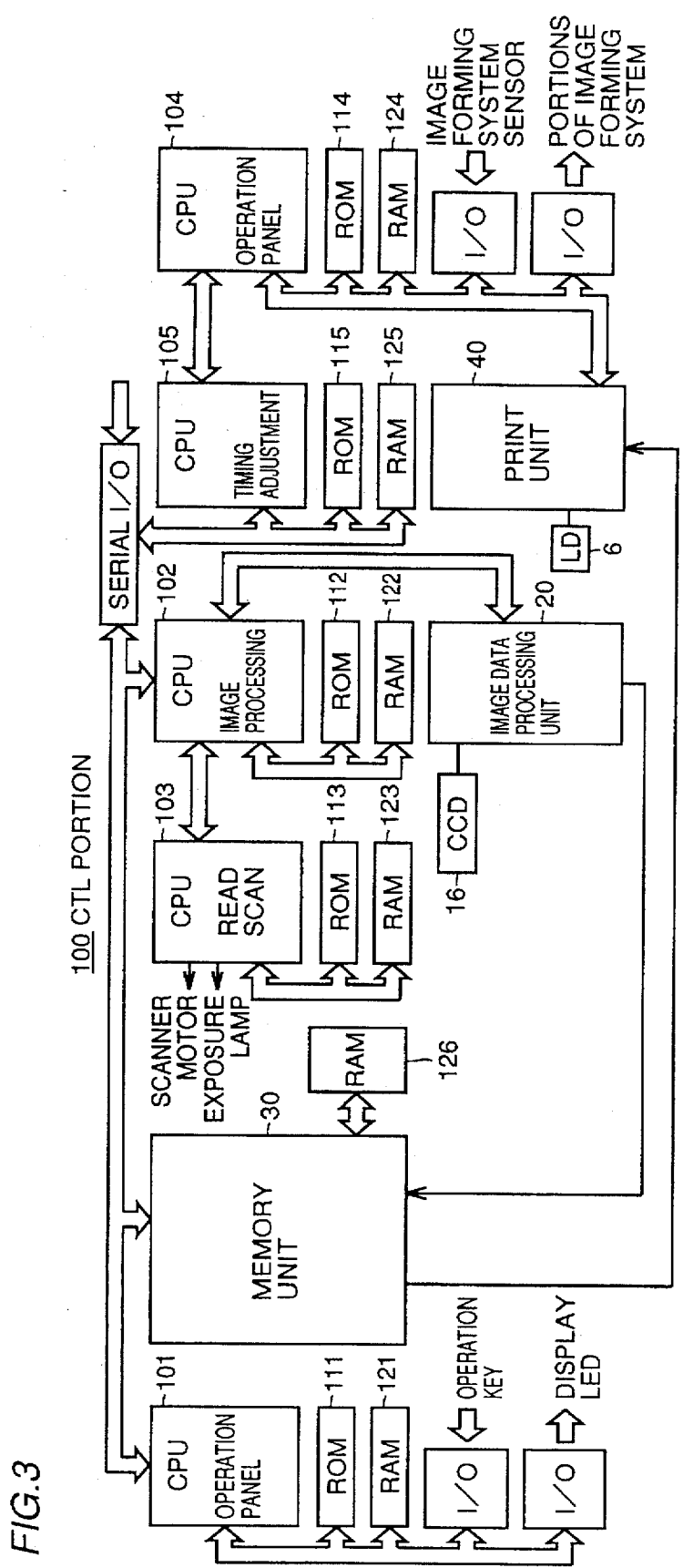
FIG. 3 shows a portion of the overall structure of a control portion of the copying machine shown in FIG. 1.
Figure 4:
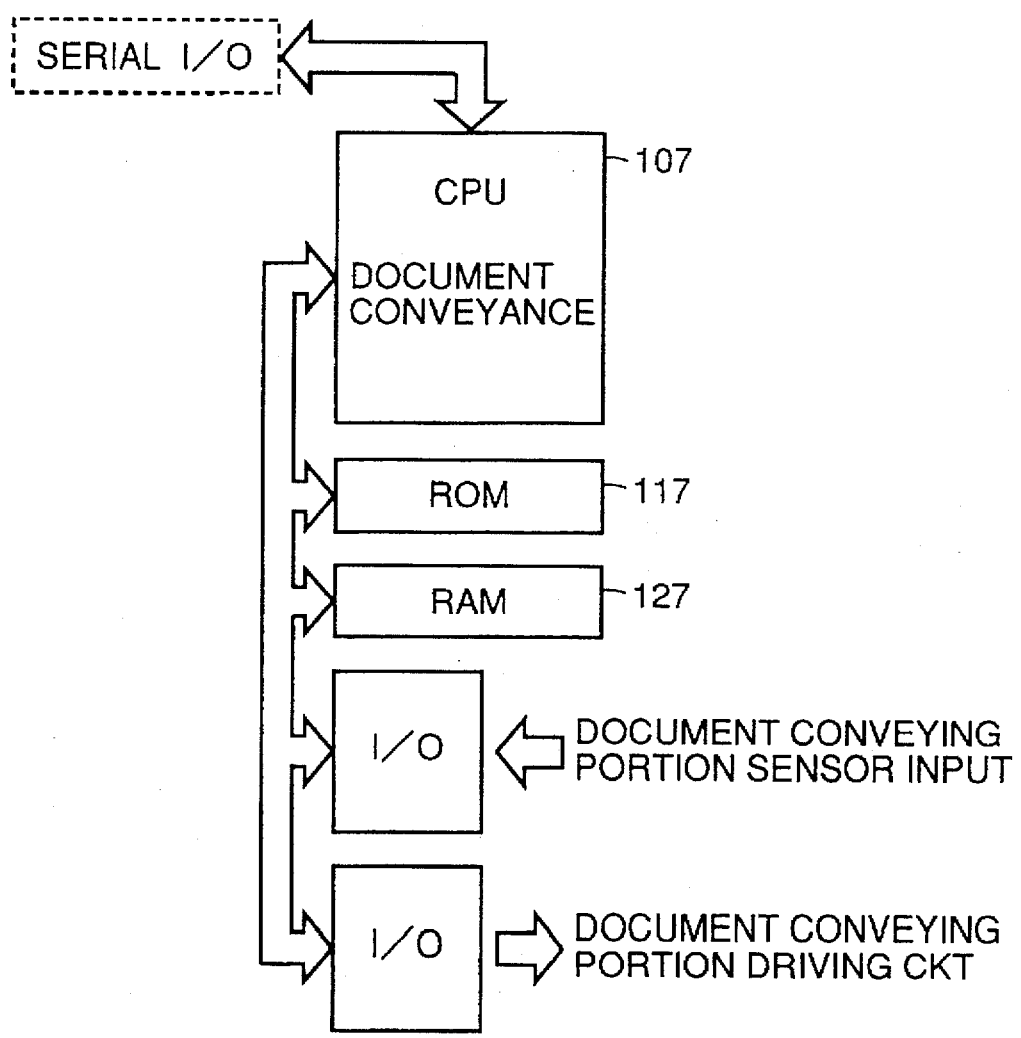
FIG. 4 shows another portion of the overall structure of the control portion of the copying machine shown in FIG. 1.

Control portion of the copying machine will be described. FIGS. 3 and 4 are block diagrams showing the overall structure of the control portion. The control portion is structured mainly by six CPUs 101 to 107. CPUs 101 to 107 are provided with ROMs 111 to 117 storing necessary programs, and RAMs 121 to 127 which are the work area for executing programs, respectively. CPU 101 controls display and signal input through various operation keys on operation panel 90. CPU 102 controls various portions of image data processing unit 20. CPU 103 controls driving of reading system 10.

CPU 104 controls print unit 40, optical system 60, image forming system 70 and sheet conveying system 80. Detection signals from sheet size detection sensors SE11 and SE12 are input to CPU 104 through an I/O. CPU 105 controls overall timing adjustment and setting of operation mode of the control portion.

CPU 106 controls memory unit 30 such that image data transferred from image data processing unit 20 is processed as needed and turned to print data, which print data is transferred to print unit 40. CPU 107 controls ADF 500, and it is connected to CPUs 101, 102 and 105 through serial I/O. Feeding, conveying or discharging of the document is instructed by CPU 105.

Processing portions for processing image data will be described in the following. First, image data processing unit 20 will be described. Image data processing unit 20 includes an A/D converter, a shading correcting portion, and a known image correcting portion for performing image quality correction including MTP correction and gamma correction, and for changing magnification and editing images.

Figure 5:
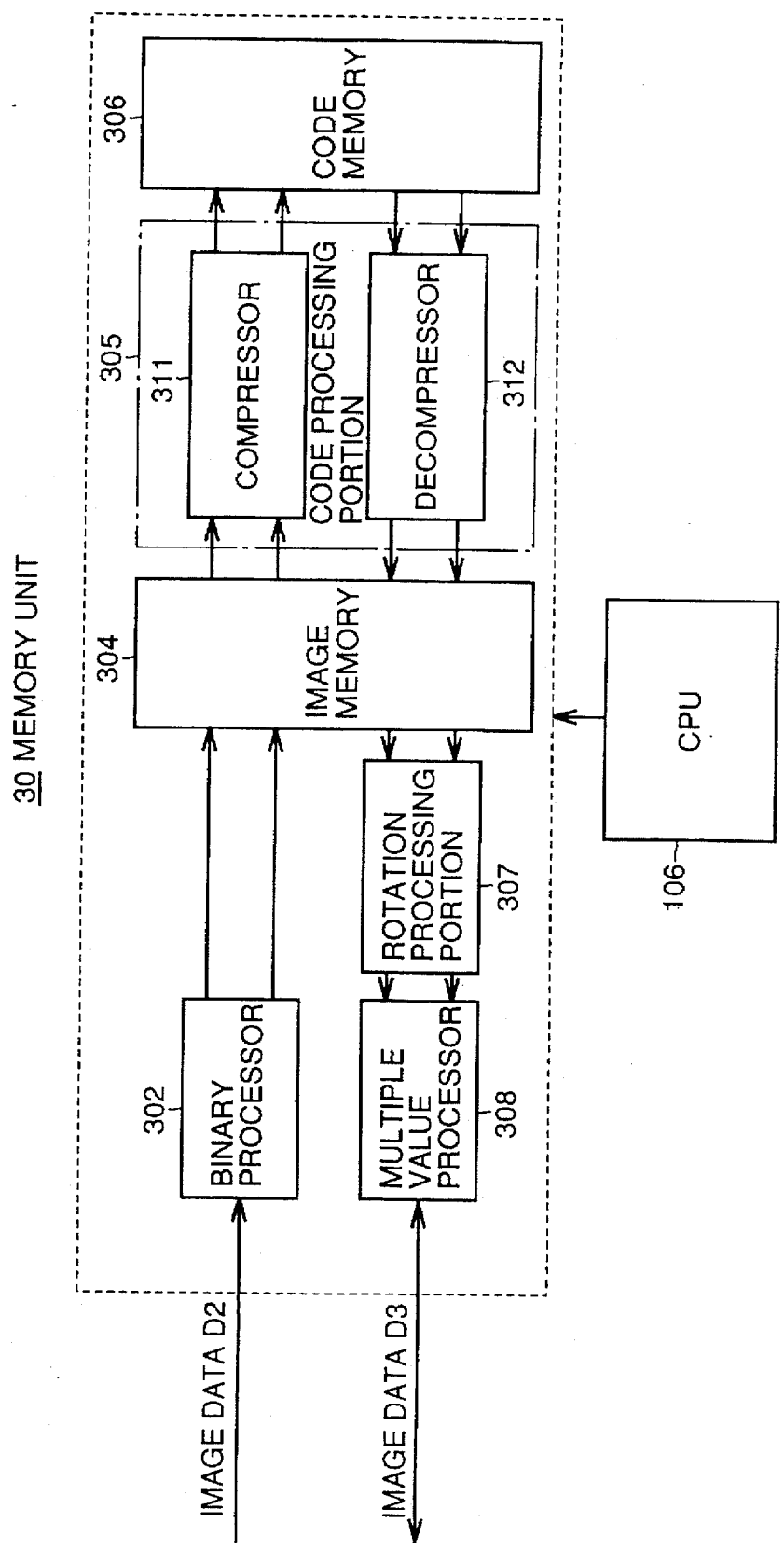
FIG. 5 shows a structure of a memory unit shown in FIG. 1.

Memory unit 30 will be described with reference to FIG. 5. Memory unit 30 is controlled by CPU 106, and includes a binary processing portion 302 for generating binary data, an image memory 304, an RAM 126 (see FIG. 3) for generating management table MT1, a code processing portion 305 having a compressor 311 and a decompressor 312 which are independently operable, a code memory 306 having multiple ports, a rotation processing portion 307 and a multiple value processing portion 308.

Image data D2 corresponding to one page of document transferred from image data processing unit 20 is first written to image memory 304. The image data written to image memory 304 is compressed by compressing portion 311, and written to code memory 306. The image data written to code memory 306 is read in accordance with an instruction from CPU 106, decompressed by decompressing portion 312, and written to image memory 304. The print data written to image memory 304 is transferred to print unit 40, and by the driving of optical system 60, printed on photoreceptor drum 71.

Here, code memory 306 is managed by management table MT1 stored in RAM 126. Code memory 306 is divided into memory areas of 32 K byte unit. Taking into account that writing and reading are to be controlled simultaneously, code data for each page is stored in each of the areas.

Figures 6, 7:
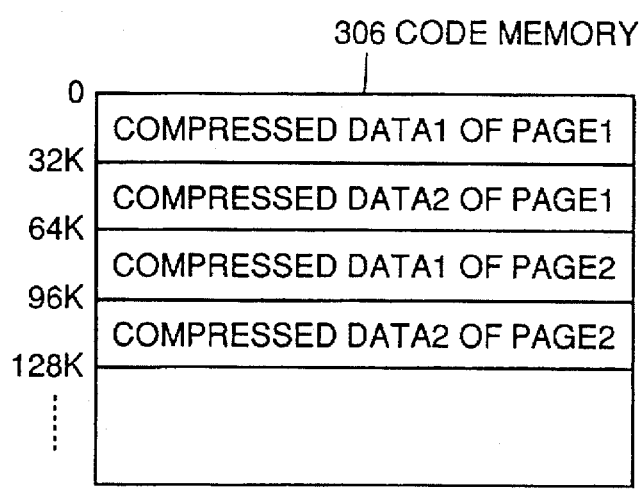
FIG. 6 shows contents of a management table.
FIG. 7 shows data structure of a code memory.

FIGS. 6 and 7 show relation between management table MT1 and code memory 306. Code memory 306 is divided into memory areas of 32 K byte unit. In order to enable simultaneous control of writing (at the time of reading) and reading (at the time of printing), code data of each page is stored in each area.

Management table MT1 stores the number indicating the code memory area, a page number, the number of concatenated area, various information necessary for compression/decompression such as the manner of compression, data length and the like, and information as to whether image rotation is necessary or not. Based on the information, code memory 306 is dynamically managed.

The forward concatenation shown in FIG. 6 indicates forward concatenation of each area containing 32 K byte within one page and indicates whether or not the area is the first area. If it is FF (in hexadecimal notation), it means that the area is the first area. Otherwise, the value represents the preceding area number. Similarly, the rearward concatenation indicates concatenation of rearward direction of each area containing 32 K byte within a page and indicates whether the area is the last area. If it is FF, it means that the area is the last area. Otherwise, the value represents the succeeding area number.

When image data is read from image memory 304 and is compressed, CPU 106 controls compressor 311 while generating information to be stored in management table MT1, and writes image data to code memory 306. CPU 106 performs reverse control to writing, when image data is read from code memory 306. More specifically, information in management table MT1 is erased when information corresponding to one page is read out for the number of times corresponding to the desired number of copies, from code memory 306.

Figure 8:
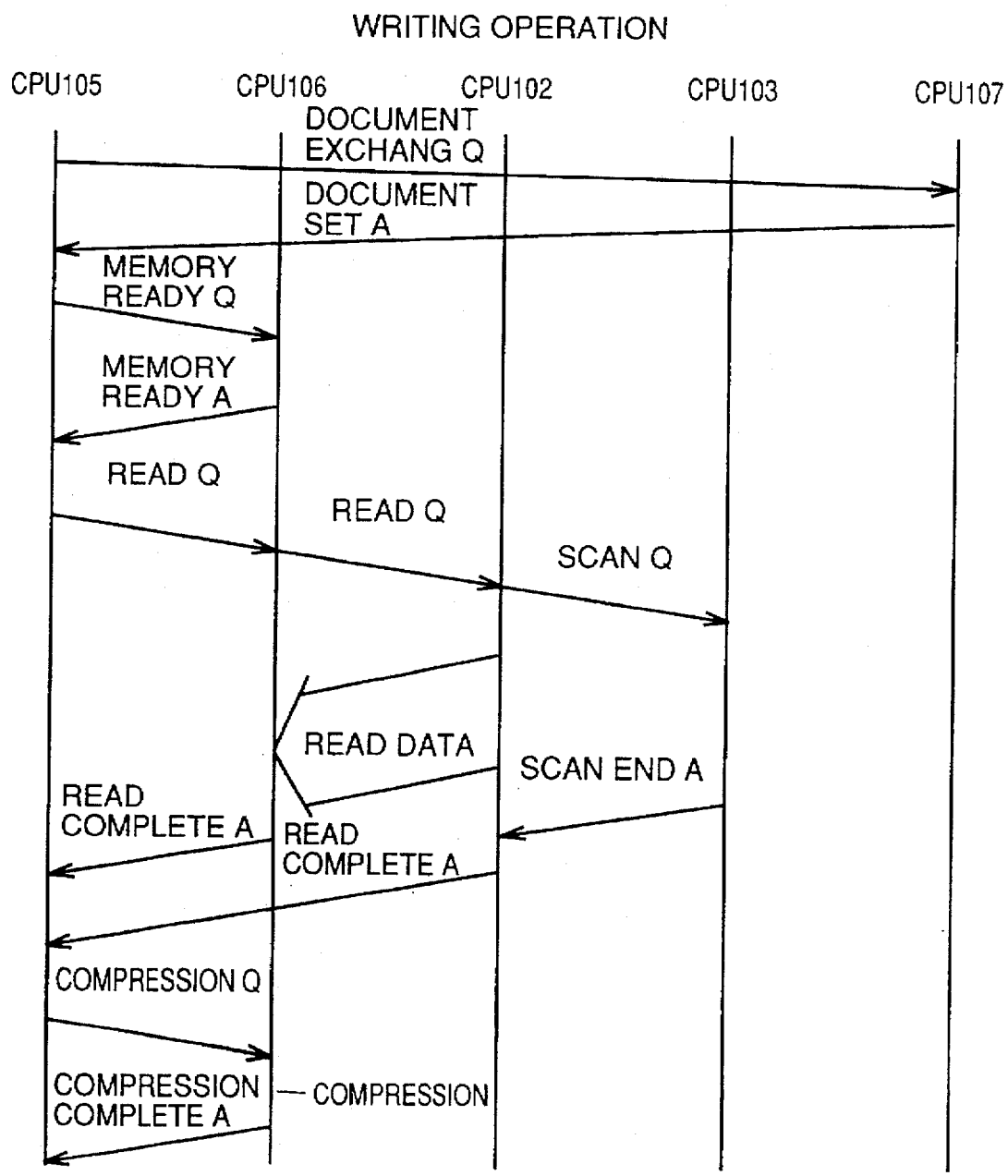
FIGS. 8 and 9 show basic sequence for writing and reading image data.
Figure 9:
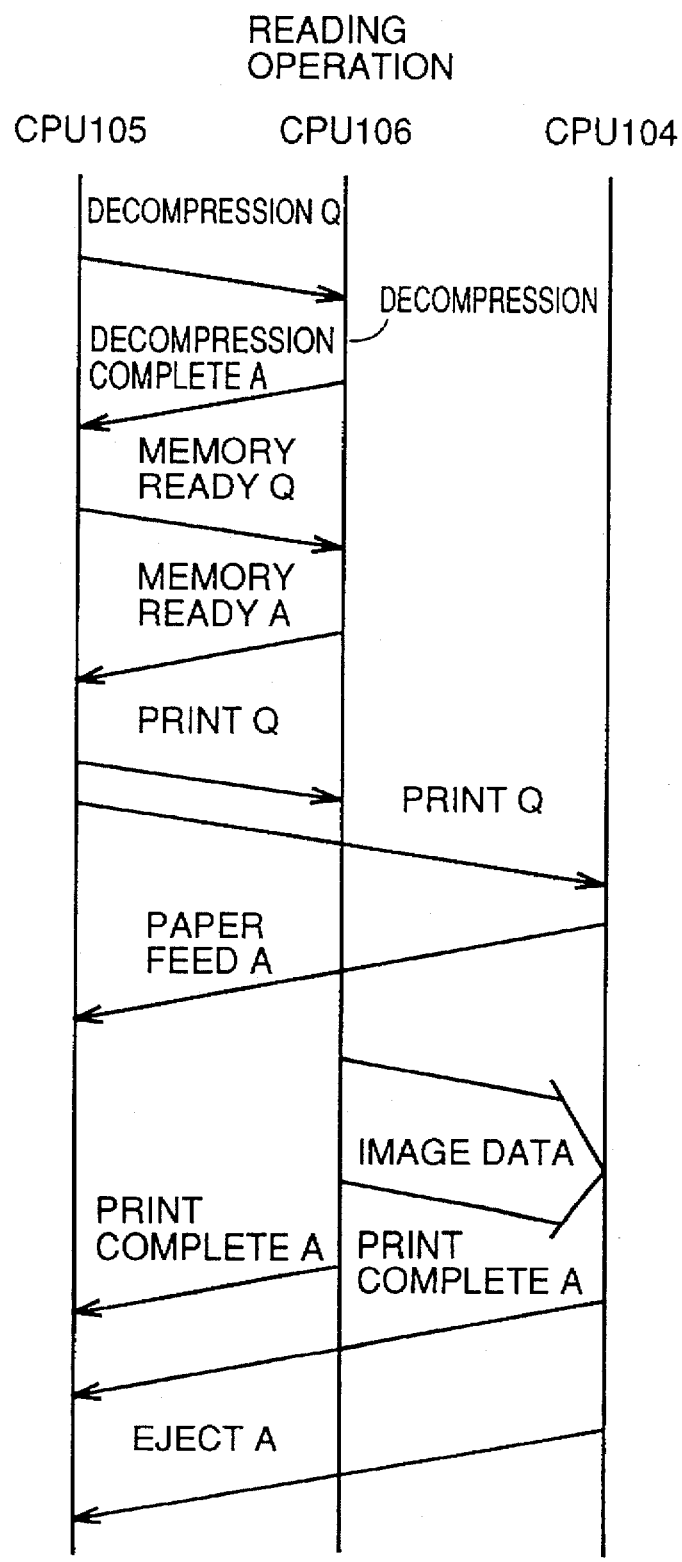

FIGS. 8 and 9 show basic image data writing/reading operation sequence. In the following, description will be given referring to a request command (Q), a report (A) and data flow between each of the CPUs 101 to 106. In the following, request the context report not of interest to the context may be omitted.

FIG. 8 shows operation sequence of writing. First, CPU 105 managing the overall sequence issues a document exchange request to CPU 105. Upon reception of this request, CPU 107 exchanges document. When a document which is being conveyed reaches a prescribed position, a document set report is issued to CPU 105.

When document set report is received by CPU 105, a memory ready request is sent from CPU 105 to CPU 106. Upon reception, CPU 105 sets mode for binary processing (for example, error variance, threshold value for base erasure and so on) in the internal hardware, and sets start address of write area and XY lengths information in image memory 304.

When such settings are completed and the memory is ready, CPU 106 outputs a memory ready report to CPU 105. In response, CPU 105 outputs read request to CPUs 106 and 102. Further, CPU 102 outputs scan request to CPU 103, whereby scanning starts.

When image area of the document is reached by the scanning, in accordance with the image processing mode set by CPU 102, read data (image data D2) is output to memory unit 30.

When reading by scanning completes, CPUs 106 and 102 output read complete report to CPU 105. Thereafter, CPU 105 outputs a compression request to CPU 106. In response, CPU 106 sets read address from image memory 103, XY length information, write address to code memory 306 and mode of a compressor 311 (for example, MH method), and activates the compressor 311. Consequently, compression processing is performed, and code data is stored in code memory 306. When compression is completed, compression complete report is output from CPU 106 to CPU 105.

FIG. 9 shows basic image data reading operation sequence. In reading operation, image data is read from image memory 304, output to print apparatus PRT, and is printed on a sheet.

First, a decompression request is output from CPU 105 to CPU 106. In response, CPU 106 sets read address from code memory 306, data amount, write address to image memory 304, XY length information and mode of a decompressor 312 (for example, MH method), and activates the decompressor 312. Consequently, decompression is performed, and image data is written to image memory 304. At this time, when it is determined that the image data is for the document requiring a sheet insertion between transparent sheets in accordance with management table MT1, insertion sheet document data report is transmitted to CPU 105.

When decompression is completed, decompression complete report is output from CPU 106 to CPU 105. Thereafter, from CPU 105 to CPU 106, a memory ready request is output for reading image data from image memory 304. In response, CPU 106 performs setting of circuit processes for outputting image data D3 from image memory 304 to print unit 40, and settings of start address of read area of image memory 304, XY length information and so on.

When such settings are completed and the memory is ready, CPU 106 outputs a memory ready report to CPU 105. In response, when the insertion sheet document data report has been received in advance, CPU 105 informs a predetermined paper feed inlet for the insertion sheet to CPU 104. Further, a print request is output to CPUs 106 and 104, and a paper feed report indicating the state of conveying the sheet is output from CPU 104 to CPU 105. Thereafter, image data D3 read from image memory 304 is output to printer apparatus PRT, and printing is performed. At this time, when there is "image rotation necessary" information in management table MT1, image data rotated by 90° will be output to printer apparatus PRT.

When printing is completed, a print complete report and an eject complete report are output from CPUs 106 and 104 to CPU 105. In response, CPU 105 outputs a memory clear request, for example, to CPU 105, in accordance with the operation mode.

Figure 10:
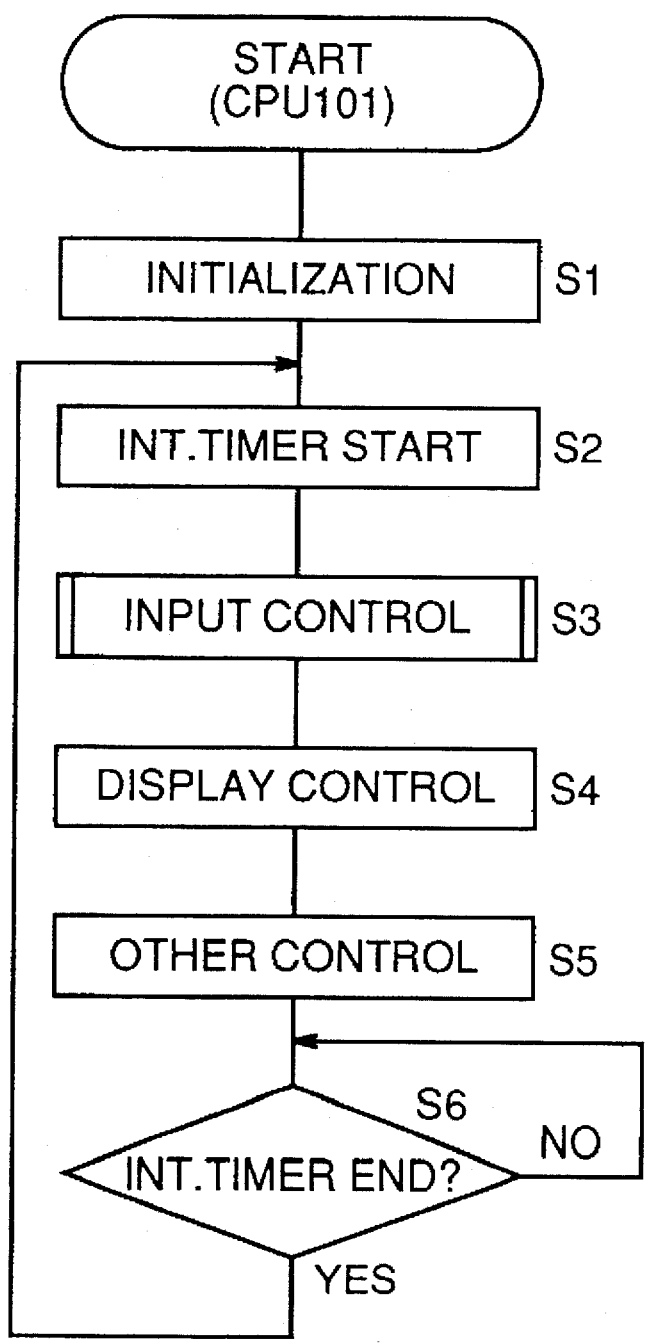
FIG. 10 is a flow chart of a main routine of a CPU 101.

The operation of the copying machine will be described with reference to the flow charts. FIG. 10 is a flow chart of the main routine of CPU 101.

After initialization (step S1, hereinafter "step" will be omitted), an internal timer is started, so that the time for the routine is constant (S2, S6). The description of internal timer is common to the operations of CPUs 102 to 105 and 107. Therefore, the description will not be repeated for other CPUs. Then, input control process and display control process are performed through operation panel 90 or the like (S3, S4) and other processes are performed (S5). Communication with other CPUs 102 to 107 is performed by interruption.

FIGS. 11 to 15 are flow charts showing subroutines related to key processes related to the present invention, in the input control process S3 shown in FIG. 10.

Figure 11:
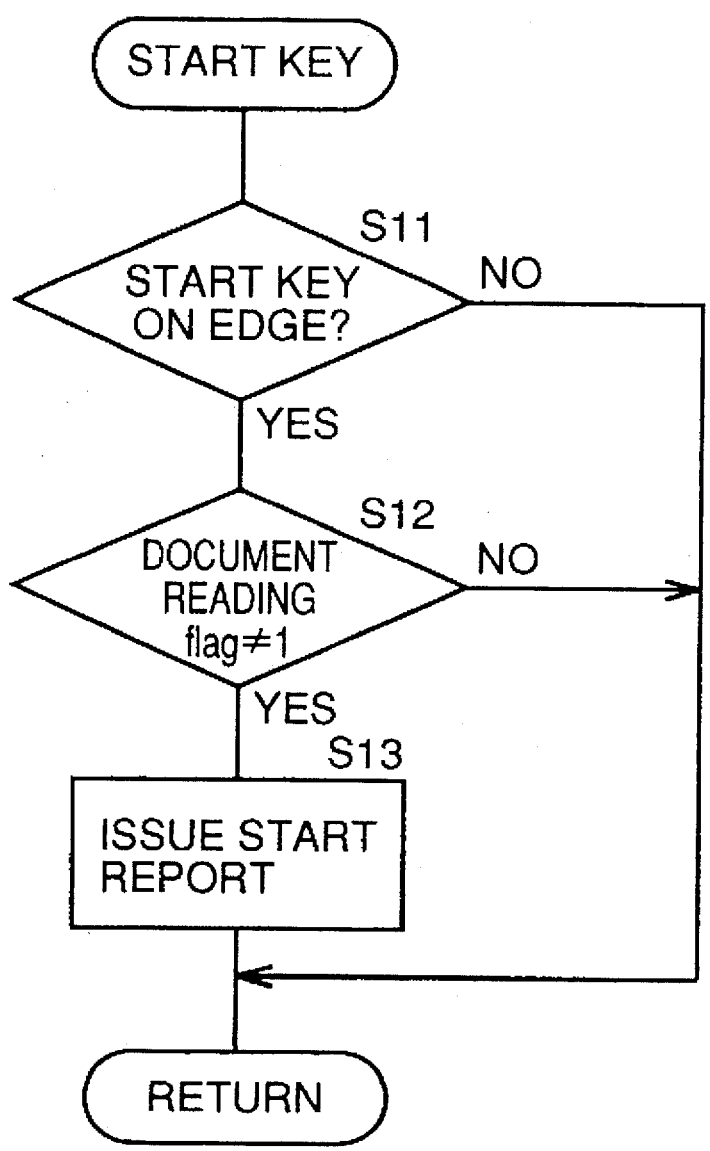
FIG. 11 is a flow chart related to a start key.

FIG. 11 is a flow chart related to start key 96. When start key 96 is turned on, an on edge is detected (YES in S11). If the document is not being read (YES in S12), a start report is transmitted to CPU 105 (S13).

Figure 12:
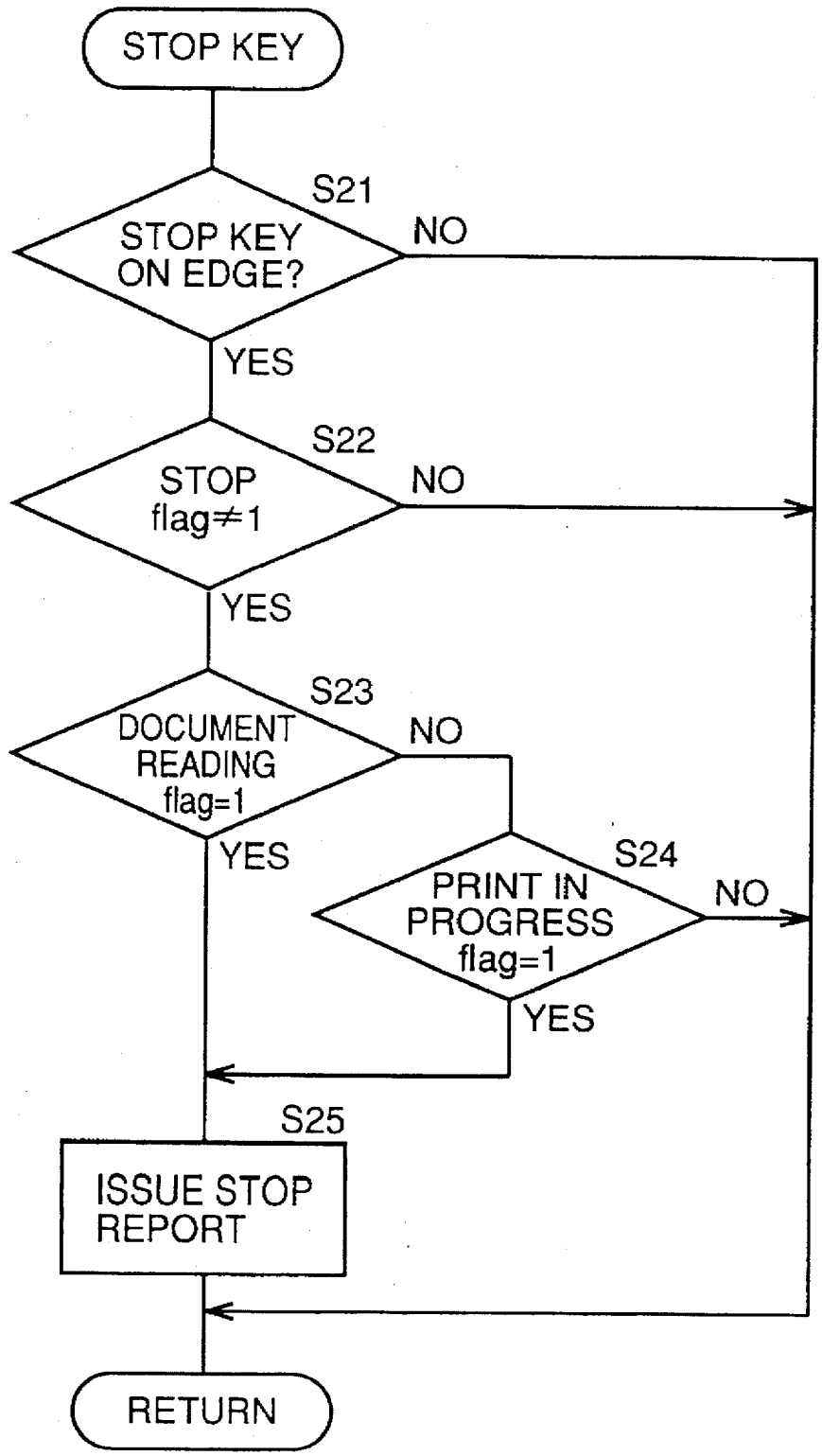
FIG. 12 is a flow chart related to a stop key.

FIG. 12 is a flow chart related to stop key 95. When stop key 95 is turned on, an on edge is detected (YES in S21). If the copying machine is not stopped (YES in S22) and the document is being read (YES in S23), or when the document is not being read (YES in S23) and printing is in progress (YES in S24), then a stop report is transmitted to CPU 105 (S25).

Figure 13:
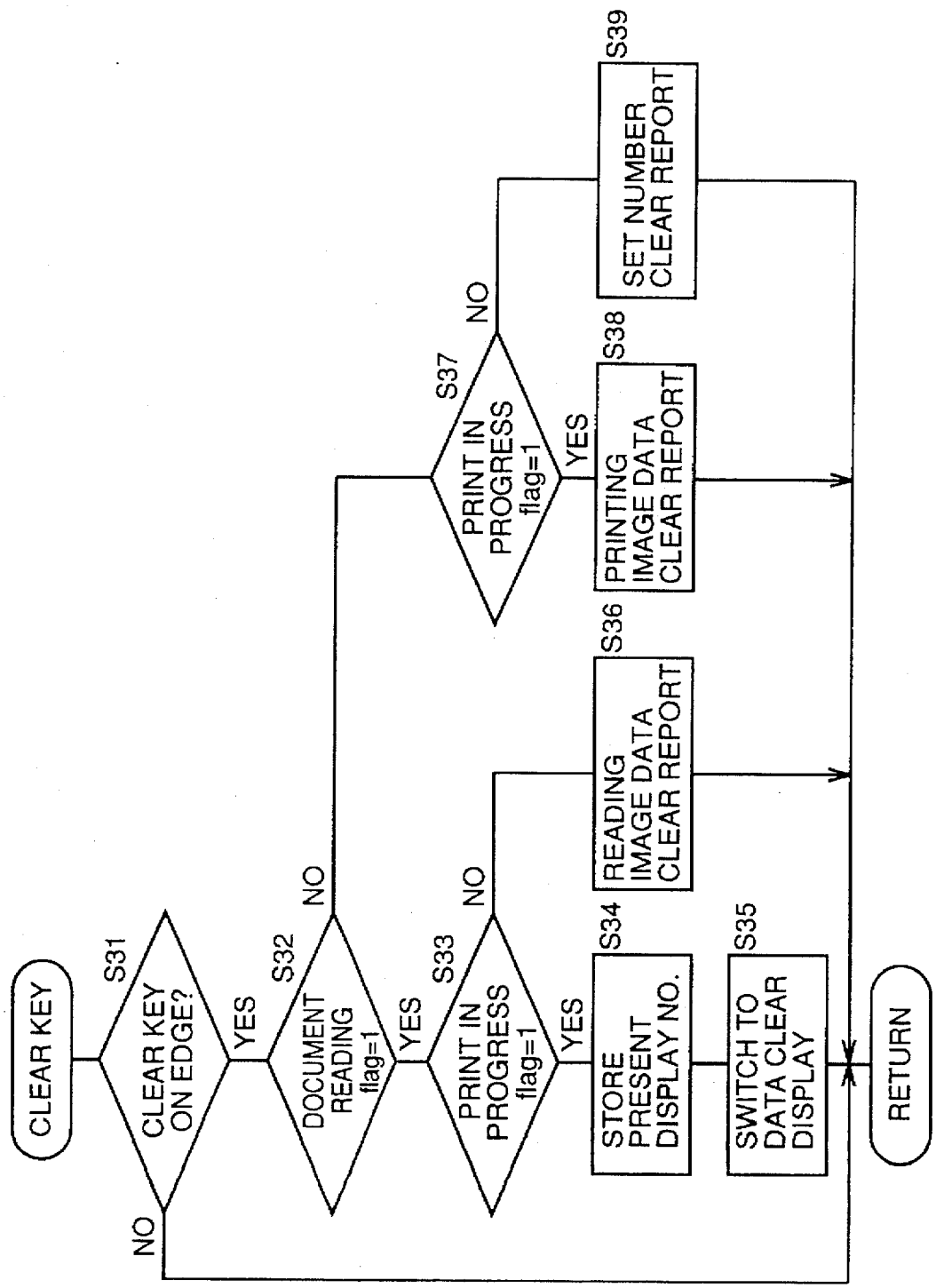
FIG. 13 is a flow chart related to a clear key.

FIG. 13 is a flow chart related to clear key 93. When clear key 93 is turned on, an on edge is detected (YES in S31), and when the document is being read and printing is in progress (YES S32 and YES in S33), the present display number is stored (S34), and the display is switched to a data clear display (S35). The data clear display will be described later with reference to FIG. 23. Meanwhile, when the document is being read but the printing is not in progress (YES in S32, NO in S33), reading image data clear report is transmitted to CPU 105 (S36). When the document is not being read but printing is in progress (NO in S32 and YES in S37), a printing image data clear report is transmitted to CPU 105 (S38). When the document is not being read and printing is not being in progress, either (NO in S32, NO in S37), a set number clear report is transmitted to clear set number (S39).

Figure 14:
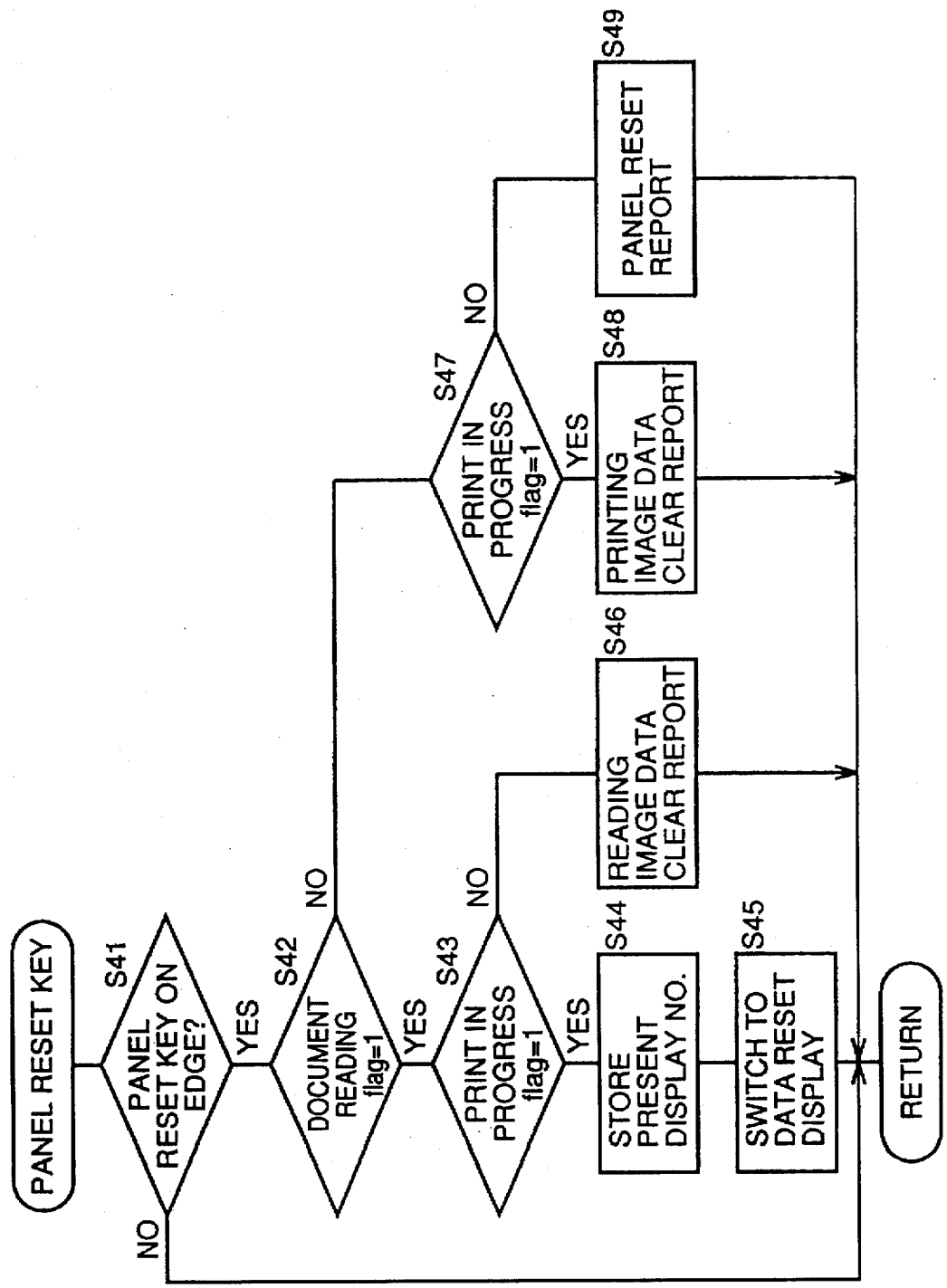
FIG. 14 is a flow chart related to a panel reset key.

FIG. 14 is a flow chart related to a panel reset key 94. Referring to FIG. 14, when panel reset key 94 is turned on, an on edge is detected (YES in S41), and when the document is being read and printing is in progress (YES in S42, YES in S43), the present display number is stored (S44) and the display is switched to a data reset display (S45). When the document is being read but the printing is not in progress (YES in S42, NO in S43), a reading image data reset report is transmitted to CPU 105. When the document is not being read but printing in is in progress (NO in S42, YES in S47), a printing image data reset report is transmitted to CPU 105 (S48). When the document is not being read and printing is not in progress, either (NO in S42, BO in S47), a panel reset report is transmitted to initialize the copying mode (S49).

Figure 15:
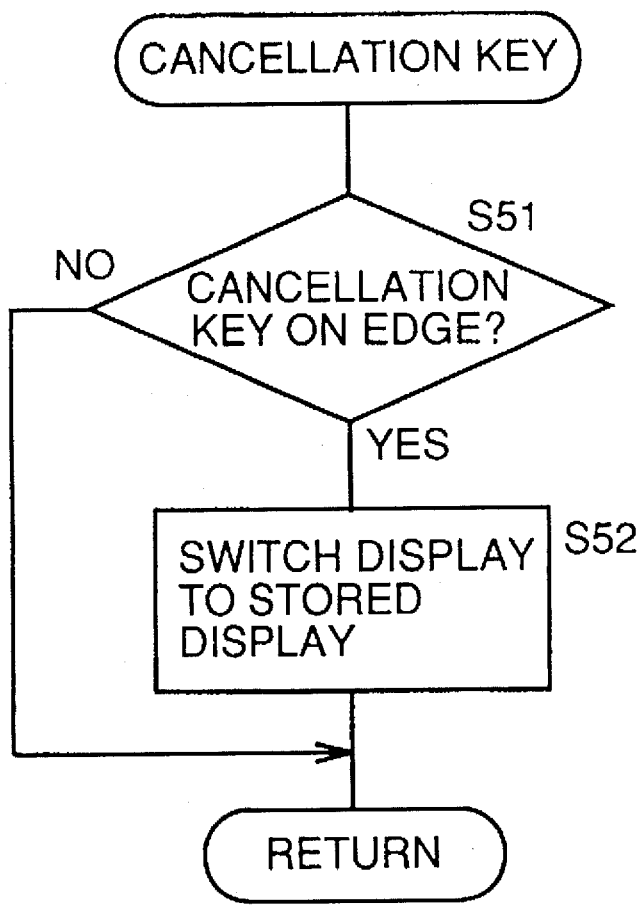
FIG. 15 is a flow chart related to a cancellation key.

FIG. 15 is a flow chart related to a cancellation key. The cancellation key will be described later with reference to FIG. 23. When cancellation key is turned on, an on edge is detected (YES in S51), the stored display number is read to return to the display, and the display is switched to the previous display (S52).

Here, "printing is in progress" means the state from the start of printing of the job to be printed on the memory until all the data are processed and not left in the memory. "Document is being read" means the state from the start of reading of the document, which starts by turning on the start key, until the documents to be read are all read. "Stop" means that the printing operation and reading operation are stopped by the stop key. Therefore, even when the operation is "stopped", it may be possible that "printing is in progress" or "document is being read" in the copying machine. The definitions are also applied in the following description.

Figure 16:
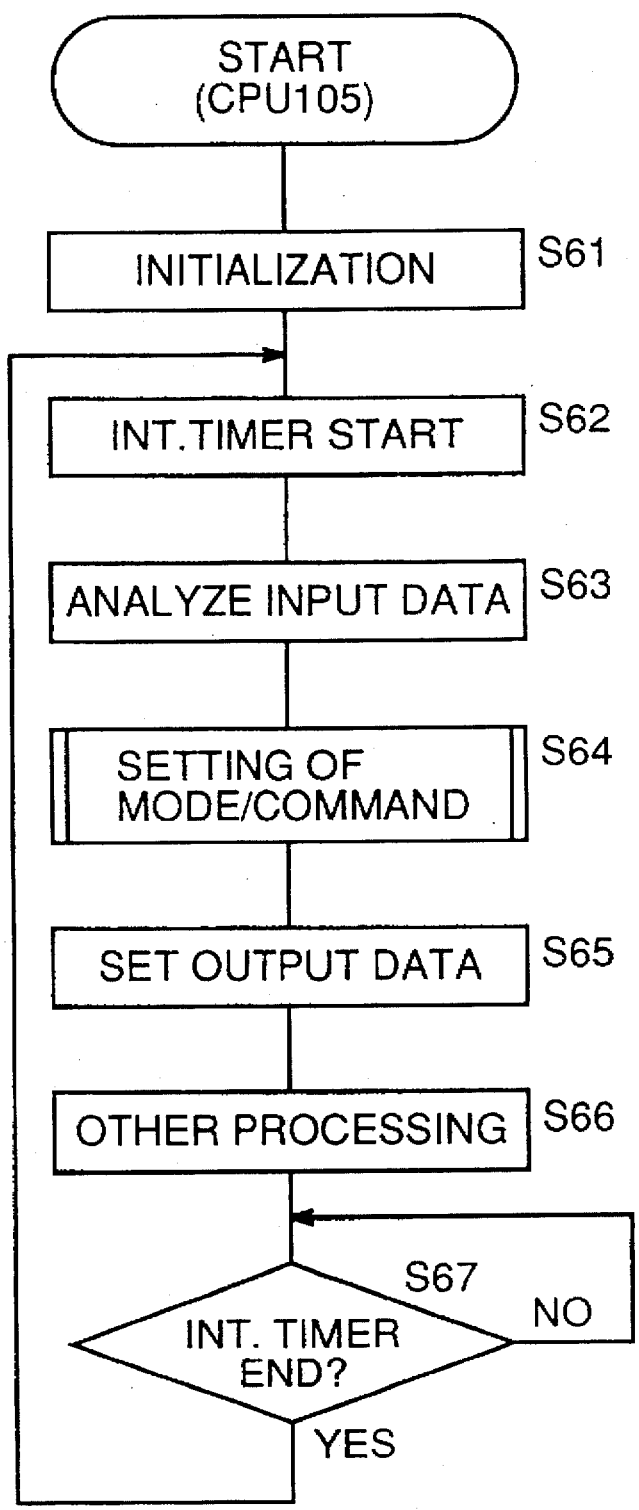
FIG. 16 is a flow chart of the main routine of a CPU 105.

FIG. 16 is a flow chart of a main routine of CPU 105. CPU 105 provides activation or stop command for other CPUs, and sets operation mode, whereby it controls overall operation of the copying machine.

Referring to FIG. 16, data input by communication which took place by interruption is checked and the content is analyzed (S63). In accordance with the content, when the operation of other component is necessary, for example, mode/command setting process for newly setting copying mode data or activation command is performed. (S64). Thereafter, data is set in an output area, so that the data is output by transmission (S65).

FIGS. 17 to 21 are flow charts showing details of the mode/command setting process (S64) shown in FIG. 16. In the following, the process for each of the received reports (S71–S83, S91–S99, S101–S112) and memory reading process for printing (S120–S129, S131–S143) will be mainly described.

Figure 17:
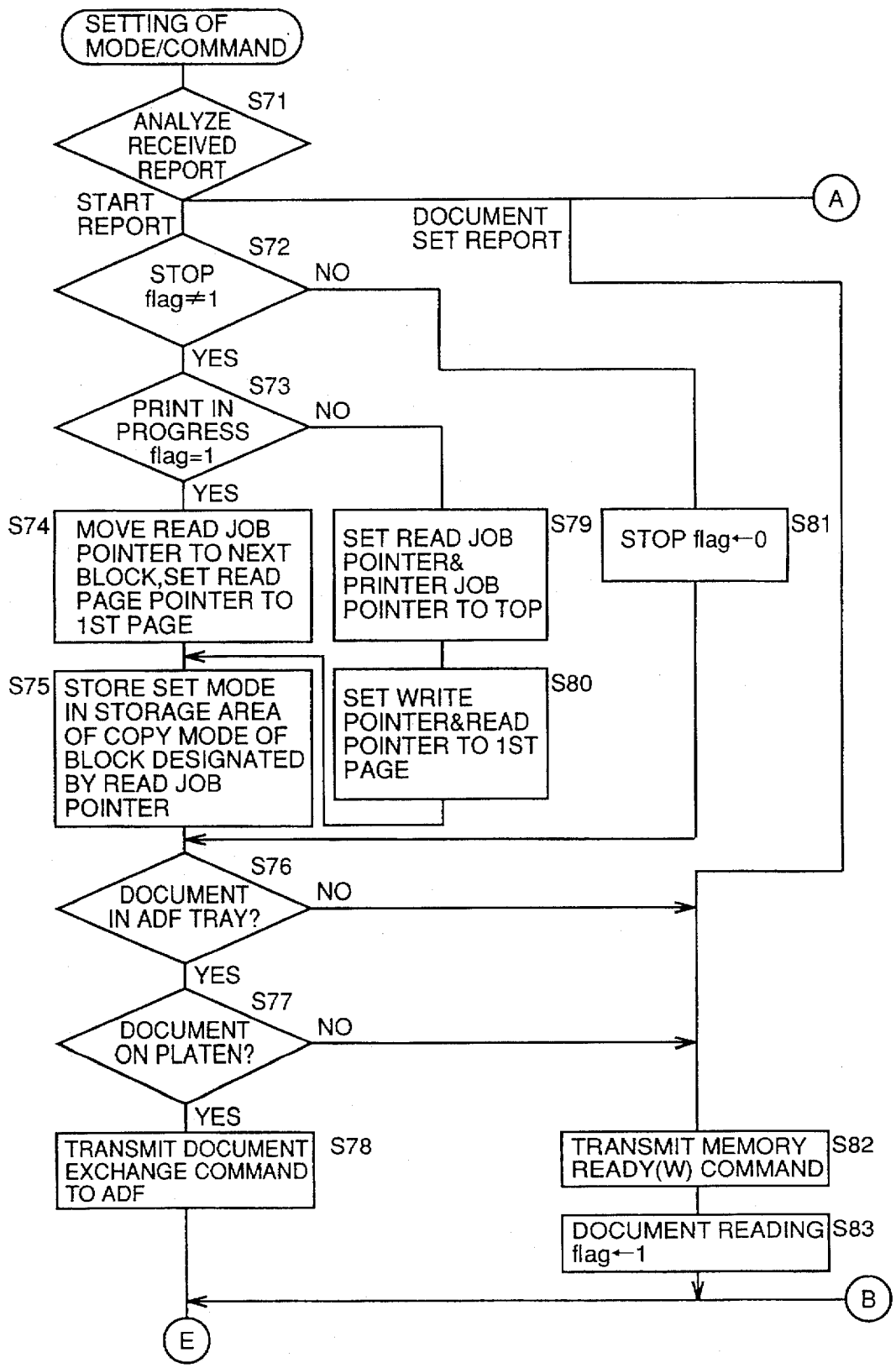
FIGS. 17 to 21 are flow charts showing details of a mode/command setting process shown in FIG. 16.

Referring to FIG. 17, first, by analyzing the received report, which of the reports is received is analyzed, and a process corresponding to each report is called (S71). Processes in steps S72 to S81 relate to the start report. By determination in S72 and S73, when the operation is not stopped and printing is in progress (YES in S72 and YES in S73), it is a start report for job reservation. Therefore, a read job pointer is moved to a next block, and a read page pointer is set to the first page, so as to be ready for reading the image data of the next job (S74). Thereafter, in the storing area of the block designated by the read job pointer, copying mode set for the reserved job is stored (S75). When ADF 500 is to be used, a document exchange request is transmitted to ADF 500 (S76–S78). When ADF 500 is not used, a memory read command is transmitted to memory unit 30, so that document is being read (S82–S83).

If the operation is not stopped but printing is not in progress, it means the job starts from the standby state. Therefore, the read job pointer and the print job pointer are initialized to the top position, the write pointer and read pointer are initialized to the first page (S79, S80), and similar to the operation for job reservation, processes following S75 are carried out. If the operation is stopped, it means that the job is restarted. Therefore, stop flag is reset (S81), the pointers are kept as they are, and processes following S76 are performed. The processes in steps S82 and S83 correspond to the operation when a document set report is received, or when a start key is pressed while the ADF is not used.

Figure 18:
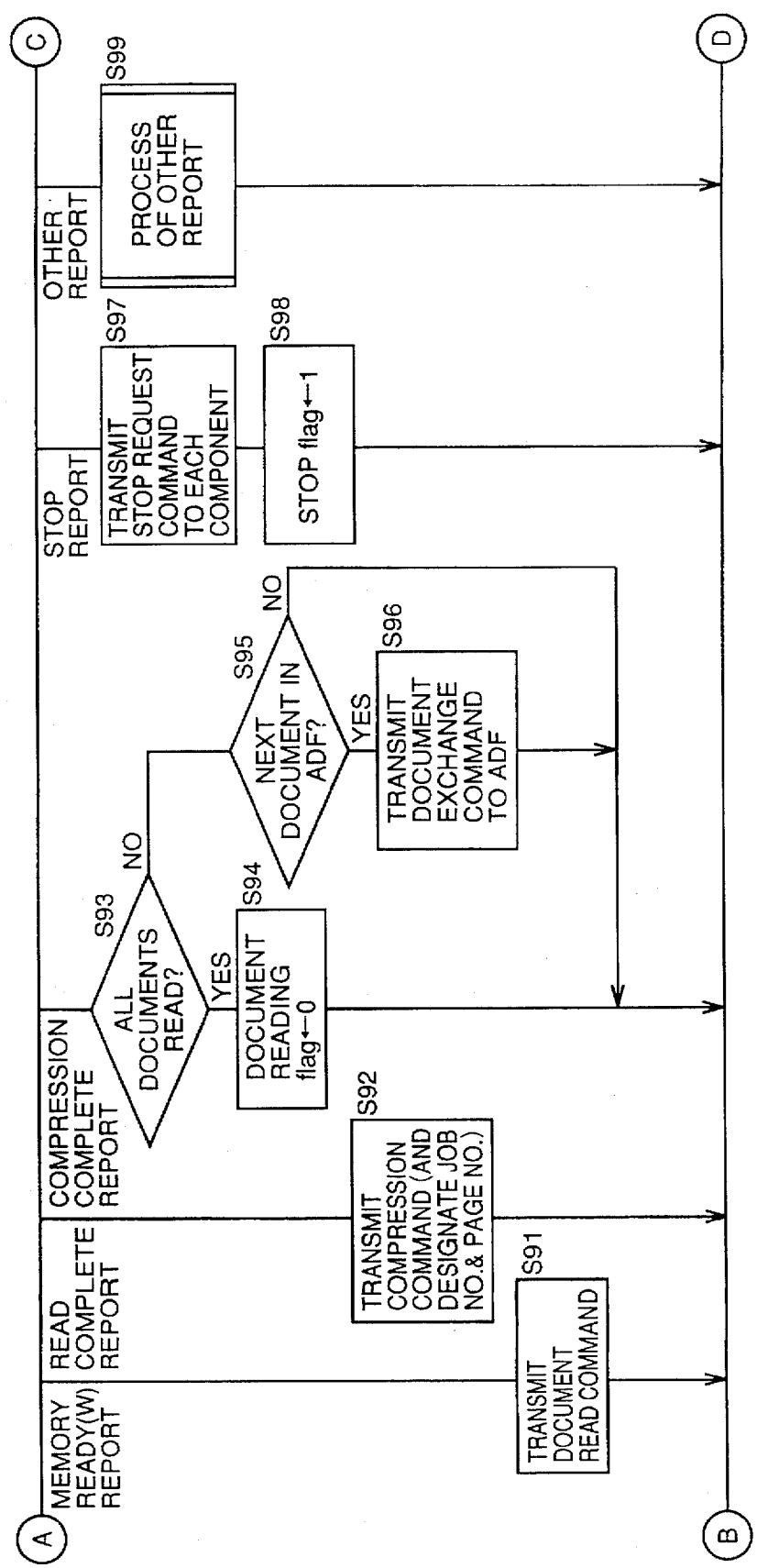

Referring to FIG. 18, the process of S91 is performed when a memory ready report is received. When the memory ready report is received, a document read command is transmitted to memory unit 30 and image data processing unit 20 (S91).

The process in S92 is performed, when a read complete report is received. When the read complete report is received, a compression command is transmitted to memory unit 30 (S92).

The processes in steps S93 to S96 are performed when a compression complete report is received. When reading of all the documents is completed (YES in S93), a document reading flag is reset (S94). When there is still documents to be read (NO in S93), and the next document exists in ADF 500 (YES in S95), then document exchange command is transmitted to ADF 500 (S96).

Processes of S97 and S98 are performed when a stop report is received. When the stop report is received, reception of the stop key is informed of various portions (S97), and a stop flag is set (S98).

The process in S99 is performed when other reports are received. When other reports are received, processes predetermined for each of the reports are performed in accordance with the report (S99).

Figure 19:
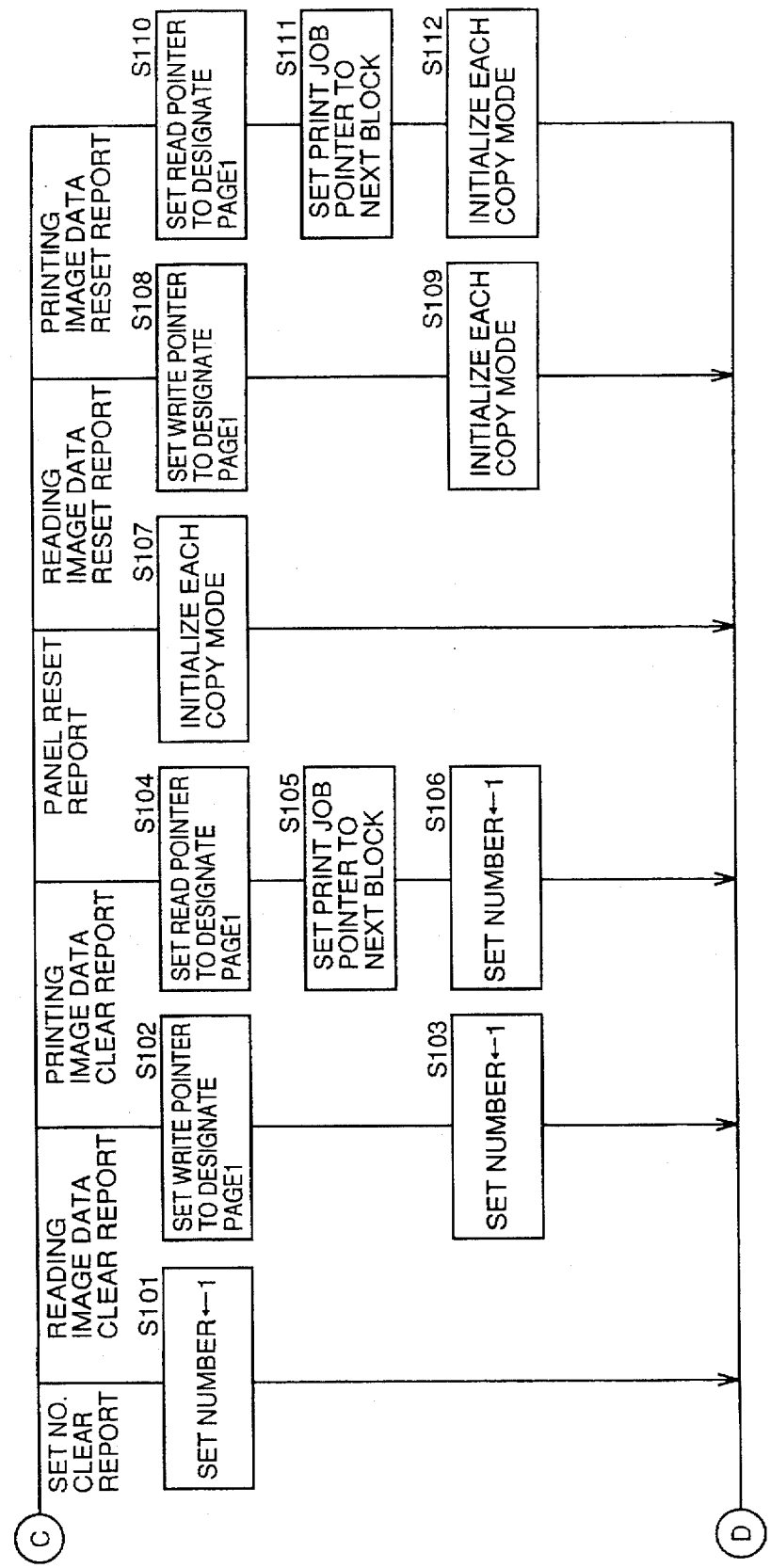

Referring to FIG. 19, the process of S101 is performed when a set member clear report is received. When the set number clear report is received, the set number is set to 1, and the set number is cleared (S101).

The processes of S102 and S103 are performed when a reading image data clear report is received. When the reading image data clear report is received, the write pointer is set to page 1 (S102), and the set number is set to 1 (S103), so as to discard image data of the job which is being read.

The processes of S104 to S106 are performed when a printing image data clear report is received. When the printing image data clear report is received, the read pointer is set to page 1 (S104), the print job pointer is set to the next block (S105), and the set number is set to 1 (S106), in order to discard image data of the job which is being printed.

The process of S107 is performed when a panel reset report is received. When the panel reset report is received, the copying mode is initialized (S107).

The processes in S108 and S109 are performed when a reading image data reset report is received. When the reading image data reset report is received, the write pointer is set to page 1 (S108) and each copying mode is initialized (S109), in order to discard the image data of the job which is being read.

The process of S110 to S112 are performed when a printing image data reset report is received. When the printing image data reset report is received, the read pointer is set to page 1 (S110), the print job pointer is set to the next block (S111), and each copying mode is initialized (S112), in order to discard image data of the job which is being printed.

Figure 20:
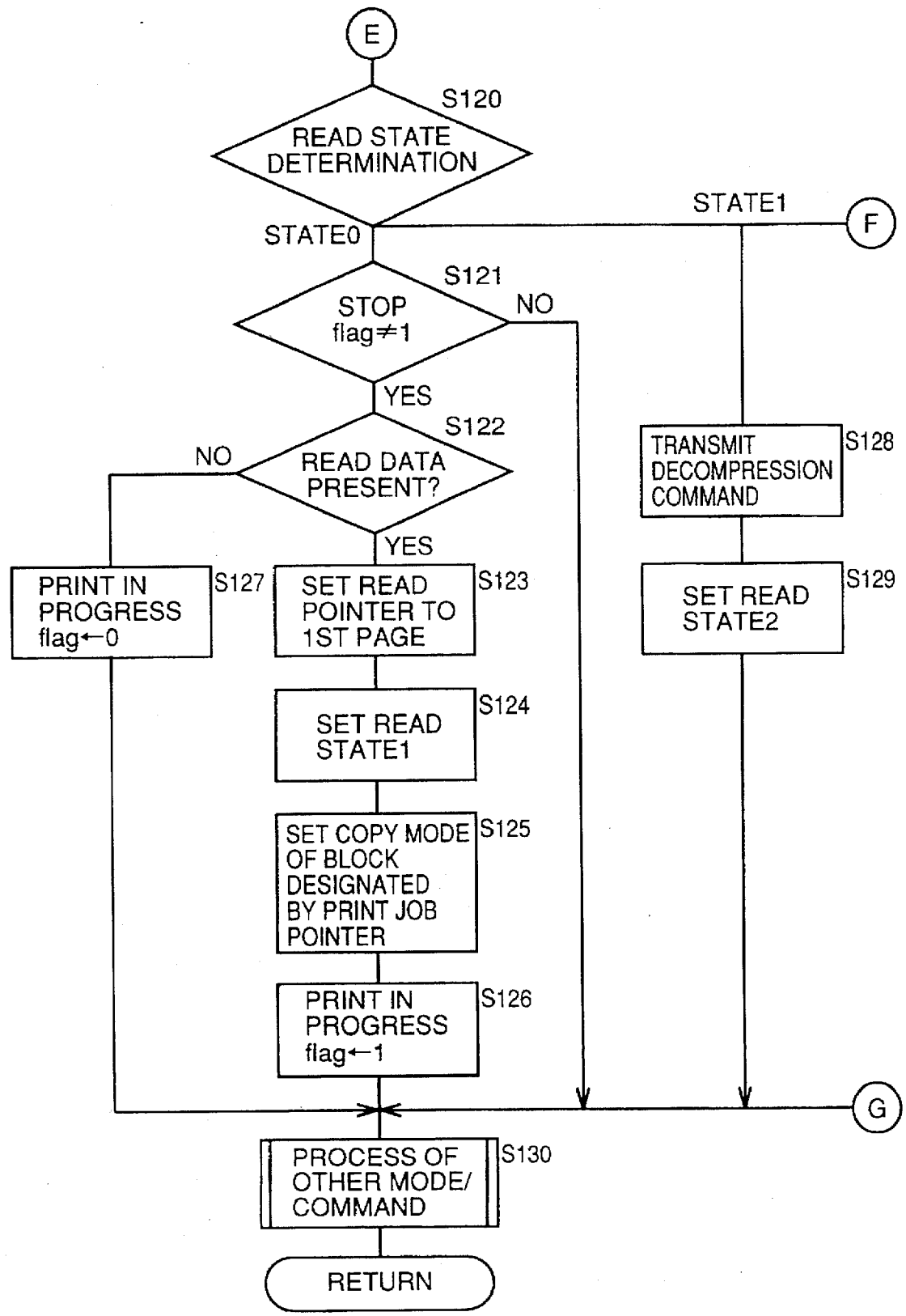
Figure 21:
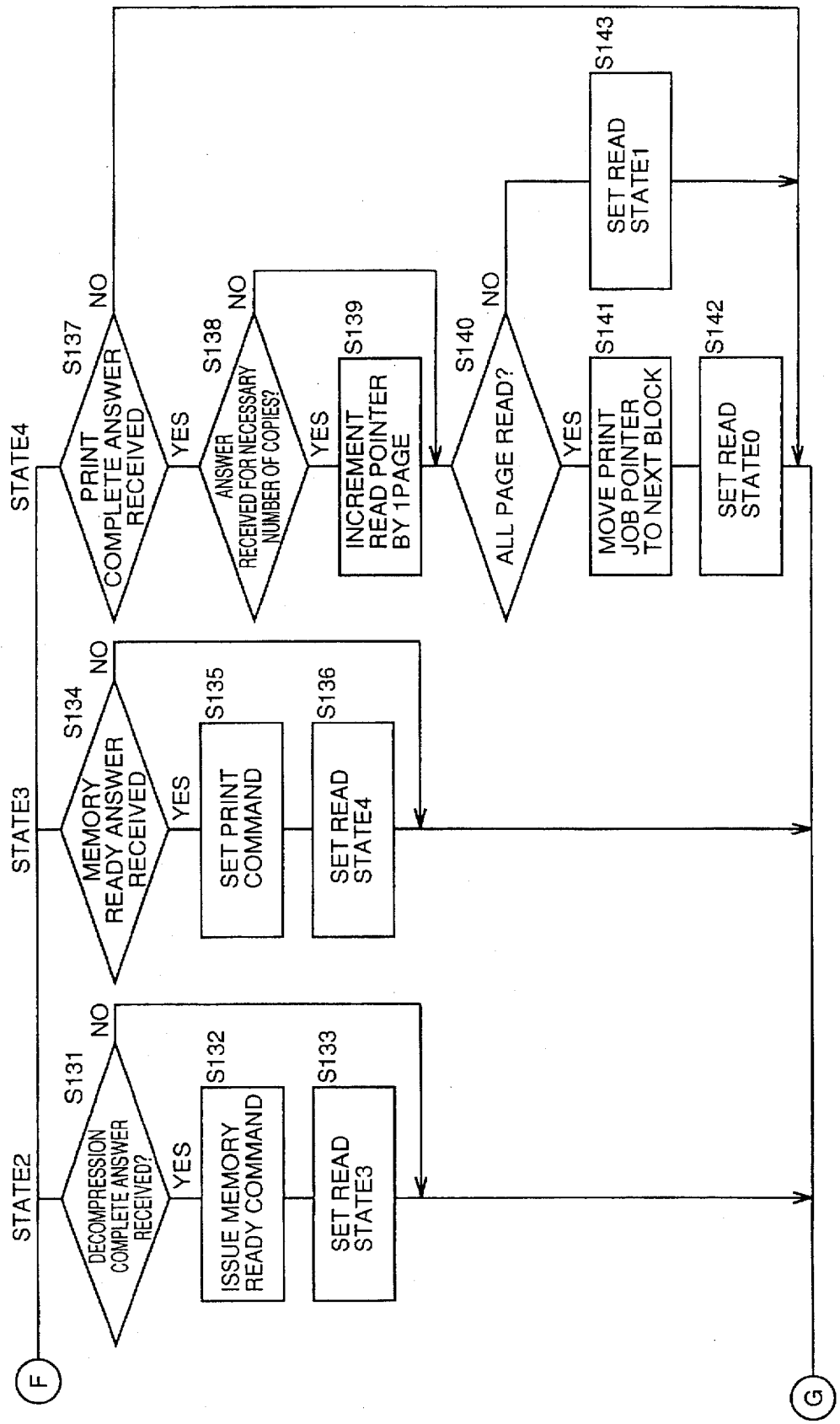

Referring to FIGS. 20 and 21, memory reading process shown in steps S120–S129 and S131–S143 will be described. First, referring to FIG. 20, the present read state is determined, and processes corresponding to the state numbers are performed (S120).

The processes from S121 to S127 are performed corresponding to read state 0. When the operation is not stopped and there is read data in the memory, the read pointer is set to 1 page, and in order to set the copying mode of the block designated by the print job pointer to the print mode, the copying mode of the block designated by the print job pointer is set, and a printing flag is set (S121–S126). When there is not read data (NO in S122), it is regarded that the printing of the job to be printed has been fully completed, and the printing flag is reset (S127).

The process of S128 and S129 correspond to read state 1. When the read state is 1, a decompression command is transmitted to memory unit 30 (S128), and read state is set to 2 (S129).

The processes of S131 to S133 correspond to read state 2. When the read state is 2, upon confirmation of reception of a decompression complete answer from memory unit 30 (YES in S131), a memory ready command is transmitted to memory unit 30 (S132), and read state is set to 3 (S133).

The processes of S134 to S136 correspond to read state 3. When the read state is 3, upon confirmation of reception of the memory ready answer from memory unit 30 (YES in S134), a print command is transmitted to memory unit 30 and print unit 40 (S135), and the read state is set to 4 (S136).

The processes of S137 to S143 correspond to read state 4. When the read state is 4, upon confirmation of reception of print complete answer from print unit (YES in S137), and the answer is received for the number of times corresponding to the necessary number of copies (YES in S138), read pointer is incremented by 1 page (S139). When reading of all the pages is completed (YES in S140), the print job pointer is moved to the block of the next job (S141), and the read state is set to 0 (S142). When reading of all the pages is not completed yet (NO in S140), read state is set to 1 (S143). When the above described processes are completed, in step S130 shown in FIG. 20, other mode/command processes are performed, and the operation is completed.

Figure 22:
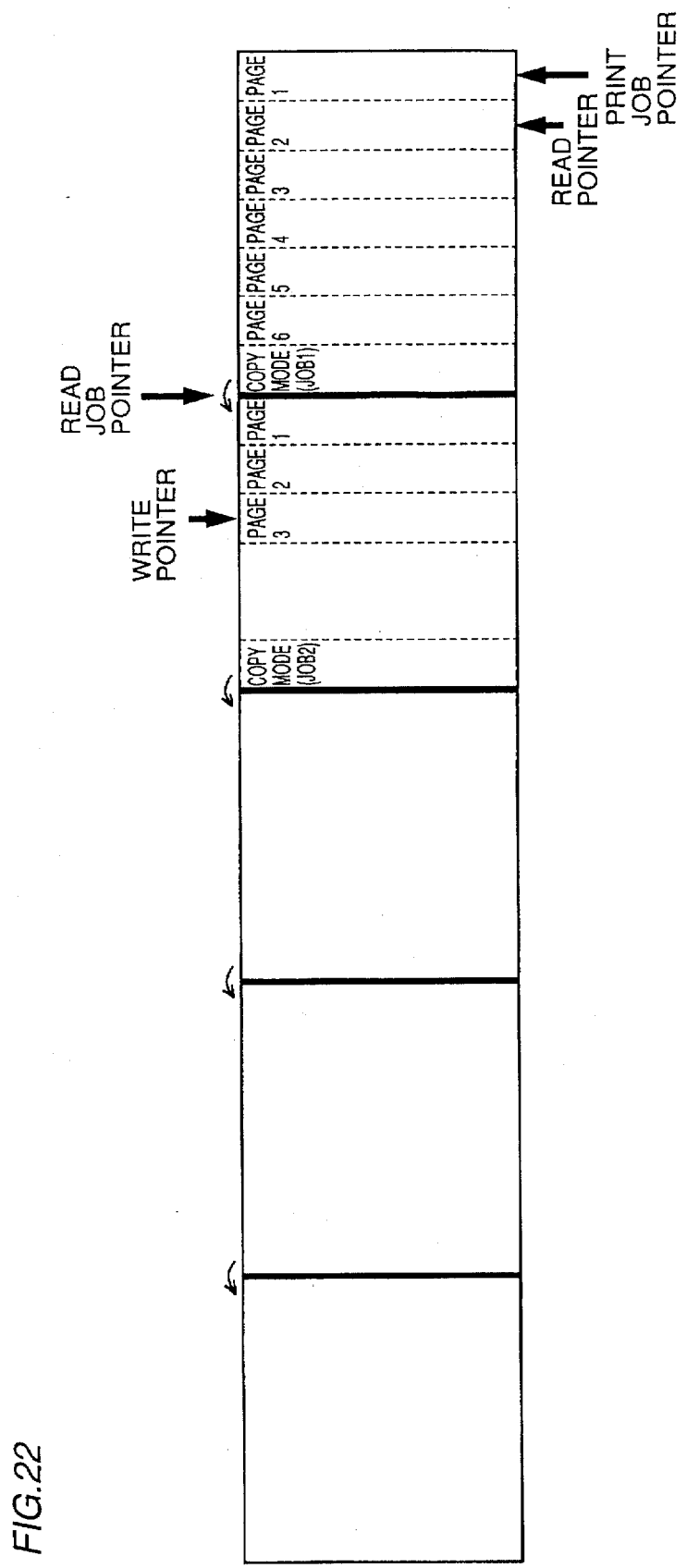
FIG. 22 shows state of management of job data on a memory.

FIG. 22 shows a state of management of job data on the memory. The memory has five job areas. When a job is reserved, the read job pointer is moved to a left job area, and in that area, the reserved copying mode and read page data are stored. At the time of printing, the copying mode of the area designated by the print job pointer is read, and stored page data is printed in the copying mode. When printing of all the pages is completed, the print job pointer is moved to the next job area, and if there is read data in this area, printing continues.

Figure 23:
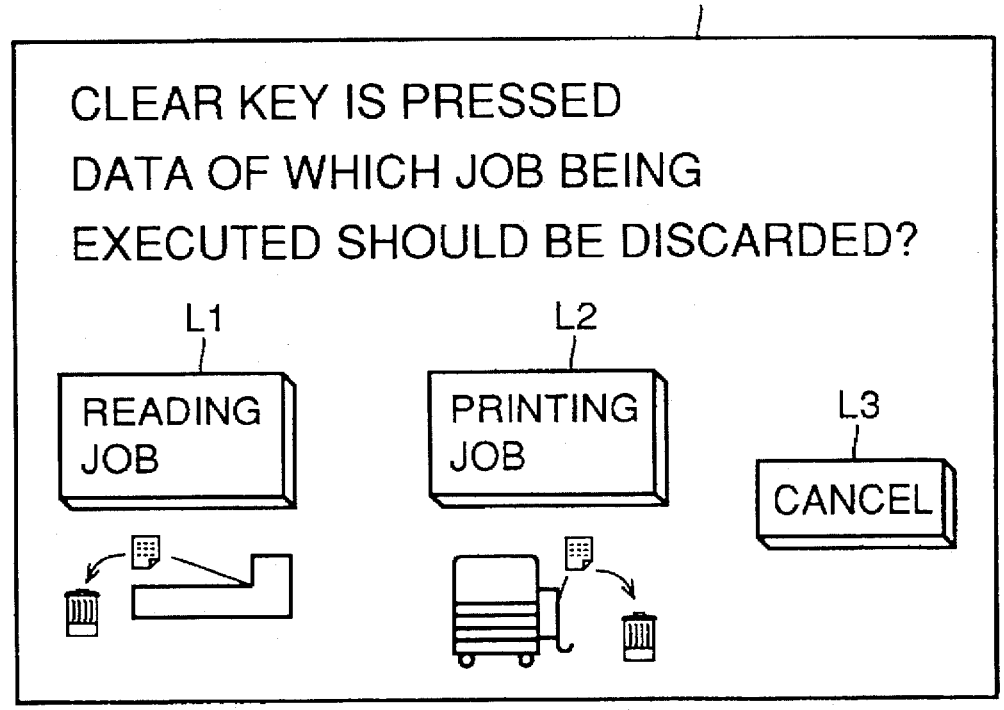

FIG. 23 shows the display on the liquid crystal display 91 when clear key 93 is turned on, that is, the data clear display. When reading is in progress and printing is in progress, a stop key 95 is turned on and thereafter clear key 93 is turned on, then this display appears. Therefore, after the clear key 93 is pressed, when the job which is being read is to be abandoned, the user touches selection key L1, and if the job which is being printed is to be abandoned, the use touches selection key L2. Therefore, selection of the job to be abandoned can be done in the similar manner as in the single job operation. By touching the cancellation key L3, the display can be switched to the previous display. The same applies to the case when panel reset key 94 is pressed.

As described above, in the copying machine in accordance with the present invention, when reading operation and printing operation are carried out simultaneously, these two operations may be stopped by stop key 95, and discard or erasure of data is instructed by one clear key 93 or the like, and by selecting either one of the selection keys L1 and L2 displayed on the liquid crystal display 91, the image data and set mode data for the job which is being read or the image data and set mode data for the job which is being printed may be selected. Therefore, without increasing the number of keys on the operation panel, the operation for abandoning data corresponding to the reading operation or the data corresponding to the printing operation can be easily abandoned even in the multiple job operation.

Though the operation of discarding is selected after all the operations are stopped once in the present embodiment, selection may be made without stopping.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus capable of processing a plurality of jobs in parallel, comprising:

image reading means for reading a document image;

storing means for storing image data for each job read by said image reading means;

image forming means for forming an image based on the image data stored in said storing means;

control means for operating said image reading means and said image forming means in parallel;

selecting means for selecting at least one of the image data of each job stored by said storing means; and erasing means for erasing image data of the job selected by said selecting means.

2. The image forming apparatus according to claim 1, further comprising:

stop instructing means for instructing stop of operation; wherein said selecting means selects, when operation is stopped by said stop instructing means, image data of each job.

3. The image forming apparatus according to claim 1, wherein said selecting means includes display means for displaying a job which is being executed, and selection is made from the job displayed on said display means.

4. The image forming apparatus according to claim 1, wherein said selecting means selects while a job is being executed.

5. The image forming apparatus according to claim 1, wherein said selecting means selects image data from a job which is being read and a job which is being printed.

6. The image forming apparatus according to claim 1, further comprising:

a key for activating said selecting means;

said selecting means includes a display for selection.

7. An image forming apparatus capable of processing a plurality of jobs in parallel, comprising:

image reading means for reading a document image;

storing means for storing image data for each job read by said image reading means;

image forming means for forming an image based on the image data stored in said storing means;

control means for operating said image reading means and said image forming means in parallel;

stop instructing means for instructing stop of operation;

selecting means for selecting at least one of the image data of each job stored by said storing means, when operation is stopped by said stop instructing means; and erasing means for erasing image data of the job selected by said selecting means.

* * * * *